US012626335B2

(12) United States Patent     (10) Patent No.:   US 12,626,335 B2
Geng                             (45) Date of Patent:      May 12, 2026

(54) IMAGE PROCESSING METHOD, ELECTRONIC DEVICE, AND STORAGE MEDIUM

(71) Applicant: GUANGDONG OPPO MOBILE TELECOMMUNICATIONS CORP., LTD., Dongguan (CN)

(72) Inventor: Fei Geng, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 412 days.

(21) Appl. No.: 18/352,724

(22) Filed: Jul. 14, 2023

(65) Prior Publication Data

US 2023/0360186 A1     Nov. 9, 2023

Related U.S. Application Data

(63) Continuation of application No. PCT/CN2021/134021, filed on Nov. 29, 2021.

(30) Foreign Application Priority Data

Jan. 18, 2021    (CN) .......................... 202110064269.6

(51) Int. Cl.
    *G06T 5/50*       (2006.01)
    *G06T 5/70*       (2024.01)
    *G06T 5/92*       (2024.01)

(52) U.S. Cl.
    CPC .................. *G06T 5/50* (2013.01); *G06T 5/70* (2024.01); *G06T 5/92* (2024.01); *G06T 2207/20208* (2013.01); *G06T 2207/20221* (2013.01)

(58) Field of Classification Search
    CPC .... G06T 5/50; G06T 5/70; G06T 5/92; G06T 2207/20208; G06T 2207/20221;
                  (Continued)

(56) References Cited

U.S. PATENT DOCUMENTS

2007/0146502 A1*   6/2007   Ahn ..................... H04N 1/6027
                                            348/E5.073
2015/0005575 A1*   1/2015   Kobayashi ............. A61B 1/045
                                            600/103

(Continued)

FOREIGN PATENT DOCUMENTS

CN       106412448      2/2017
CN       109863742      6/2019

(Continued)

OTHER PUBLICATIONS

WIPO, International Search Report and Written Opinion for PCT/CN2021/134021, Feb. 7, 2022.

(Continued)

*Primary Examiner* — Andrew W Bee
*Assistant Examiner* — Rebecca Colette Williams
(74) *Attorney, Agent, or Firm* — Hodgson Russ LLP

(57) ABSTRACT

Provided are an image processing method, an electronic device, and a storage medium. In the method, an original image is obtained by means of an image sensor. A gain is applied to the original image by means of a Pre-ISP to obtain a first image. The first image is denoised by the Pre-ISP, to obtain a second image. The original image and the second image are fused by the Pre-ISP, to obtain a fused image.

17 Claims, 6 Drawing Sheets

(58) Field of Classification Search
CPC . G06T 2207/20081; G06T 2207/20084; G06T 5/60; H04N 23/741; H04N 23/71; H04N 23/76; H04N 23/81; H04N 5/265; H04N 25/62; H04N 25/60
See application file for complete search history.

(56) References Cited

U.S. PATENT DOCUMENTS

| | | | |
|---|---|---|---|
| 2016/0150146 A1 | 5/2016 | You et al. | |
| 2018/0241929 A1 | 8/2018 | Bouzaraa et al. | |

FOREIGN PATENT DOCUMENTS

| | | | | | |
|---|---|---|---|---|---|
| CN | 110060213 | | 7/2019 | | |
| CN | 110060213 A | * | 7/2019 | ............... | G06T 5/90 |
| CN | 110062160 | | 7/2019 | | |
| CN | 110062160 A | * | 7/2019 | ............. | G06V 10/30 |
| CN | 110072051 | | 7/2019 | | |
| CN | 110135501 | | 8/2019 | | |
| CN | 107635098 | | 9/2019 | | |
| CN | 110611750 | | 12/2019 | | |
| CN | 111028189 | | 4/2020 | | |
| CN | 111028189 A | * | 4/2020 | ............... | G06T 7/11 |
| CN | 111028190 | | 4/2020 | | |
| CN | 111028190 A | * | 4/2020 | ............... | G06T 5/50 |
| CN | 111383206 | | 7/2020 | | |
| CN | 111885312 | | 11/2020 | | |
| CN | 108174125 B | * | 12/2020 | ............ | H04N 23/63 |
| EP | 3723035 | | 10/2020 | | |
| WO | 2018136373 | | 7/2018 | | |

OTHER PUBLICATIONS

CNIPA, First Office Action for CN Application No. 202110064269. 6, Oct. 8, 2022.

CNIPA, Second Office Action for CN Application No. 202110064269. 6, Apr. 28, 2023.

CNIPA, Decision of Rejection for CN Application No. 202110064269. 6, May 30, 2023.

Cogalan et al., "Deep Joint Deinterlacing and Denoising for Single Shot Dual-ISO HDR Reconstruction," IEEE Transactions on Image Processing, 2020, vol. 29.

EPO, Extended European Search Report for EP Application No. 21919043.6, Jun. 17, 2024.

CNIPA, Decision of Reexamination for CN Application No. 202110064269.6, Jun. 27, 2024.

CNIPA, Notification of Reexamination for CN Application No. 202110064269.6, May 8, 2024.

* cited by examiner

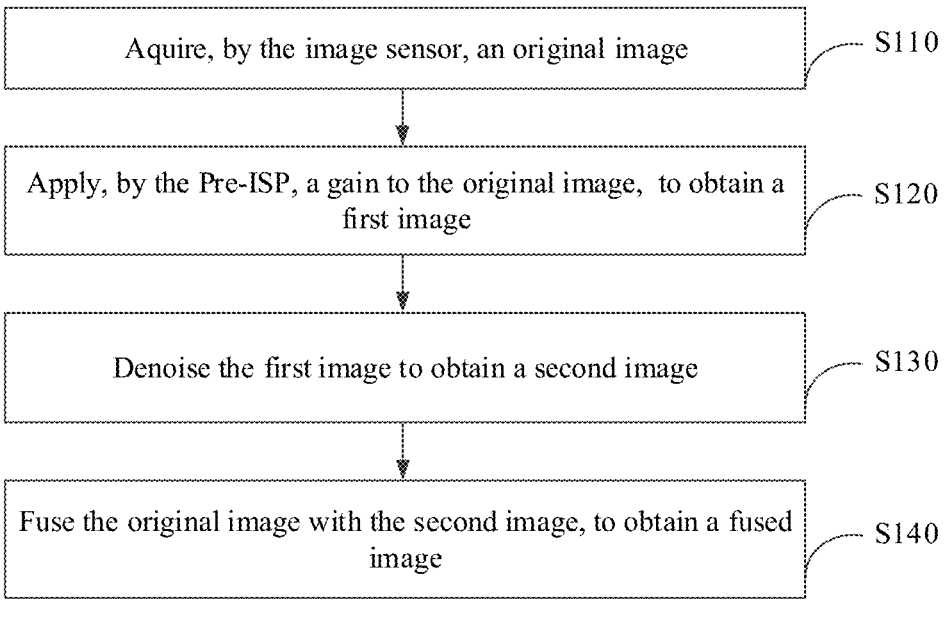

Aquire, by the image sensor, an original image — S110

Apply, by the Pre-ISP, a gain to the original image, to obtain a first image — S120

Denoise the first image to obtain a second image — S130

Fuse the original image with the second image, to obtain a fused image — S140

FIG. 1

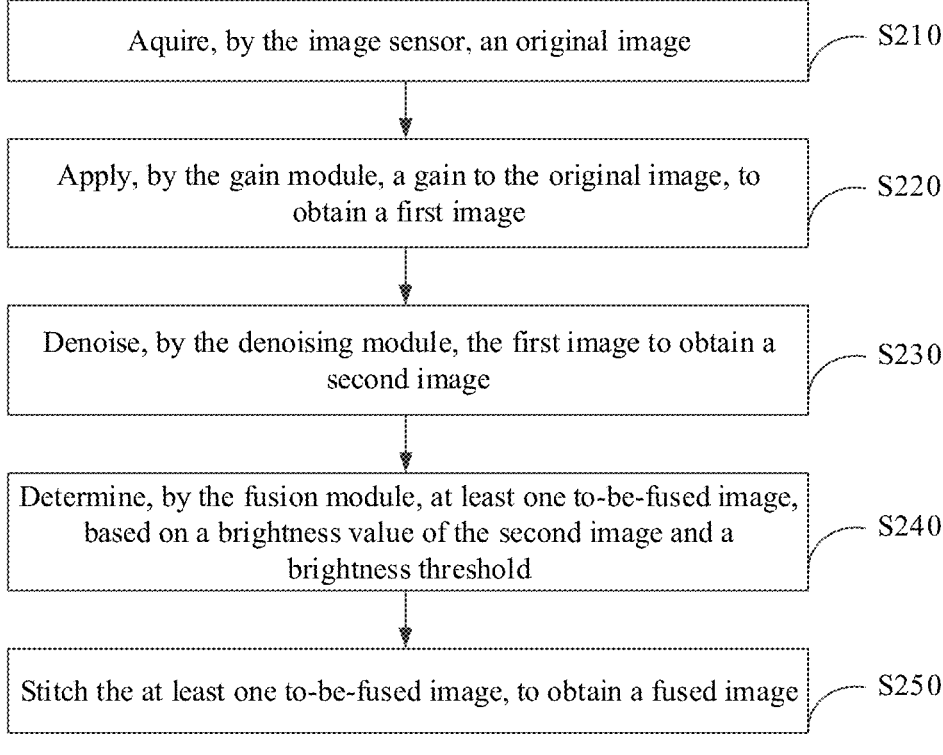

Aquire, by the image sensor, an original image — S210

Apply, by the gain module, a gain to the original image, to obtain a first image — S220

Denoise, by the denoising module, the first image to obtain a second image — S230

Determine, by the fusion module, at least one to-be-fused image, based on a brightness value of the second image and a brightness threshold — S240

Stitch the at least one to-be-fused image, to obtain a fused image — S250

FIG. 2

Image processing system 500

Computer-readable storage medium 600

— 610

Program codes, configured to execute steps in the method embodiments of the present disclosure

IMAGE PROCESSING METHOD, ELECTRONIC DEVICE, AND STORAGE MEDIUM

CROSS-REFERENCE OF RELATED APPLICATIONS

This application is a continuation of International Application No. PCT/CN2021/134021, filed Nov. 29, 2021, which claims priority to Chinese Patent Application No. 202110064269.6, filed Jan. 18, 2021, the entire disclosures of which are incorporated herein by reference.

TECHNICAL FIELD

The present disclosure relates to the field of image processing technologies, and more particularly, to an image processing method, an electronic device, and a storage medium.

BACKGROUND

With the continuous development of smart terminal technology, the usage of electronic devices (such as smart phones and cameras) is becoming more and more popular, where the majority of users record their studies, work and life through images captured by electronic devices; also, the users put forward higher requirements for the quality of the captured images. In order to improve the quality of the captured images, a camera with an HDR sensor function are usually used to generate multiple images through multiple exposures, and an HDR image is formed by fusing the multiple images obtained from multiple exposures.

However, due to time intervals between the multiple exposures, a problem of ghosting in image would be easily caused when the multiple images formed after exposures are fused.

SUMMARY

In view of the above, the present disclosure proposes an image processing method, an electronic device, and a storage medium.

In a first aspect, an embodiment of the present disclosure provides an image processing method, for an electronic device. The electronic device includes an image sensor and a Pre-ISP. The method includes: acquiring, by the image sensor, an original image; applying, by the Pre-ISP, a gain to the original image to obtain a first image, and denoising, by the Pre-ISP, the first image to obtain a second image; and fusing the original image with the second image, to obtain a fused image.

In a second aspect, an embodiment of the disclosure provides an electronic device. The electronic device includes an image sensor and a Pre-Image Signal Processor (Pre-ISP). The image sensor is configured to acquire an original image, where the original image is acquired by the image sensor without using a high dynamic range function. And the Pre-ISP is configured to apply a gain to the original image, to obtain a first image; denoise the first image to obtain a second image; and fuse the original image with the second image, to obtain a fused image.

In a third aspect, an embodiment of the present disclosure provides a non-transitory computer-readable storage medium. The computer-readable storage medium stores therein program codes which, when being executed, cause an image processing method to be implemented. The method includes: acquiring an original image, where the original image is acquired without a high dynamic range function; applying a gain to the original image, to obtain a first image; denoising the first image to obtain a second image; and fusing the original image with the second image, to obtain a fused image.

Other features and aspects of the disclosed features will become apparent from the following detailed description, take in conjunction with the accompanying drawings, which illustrate, by way of example, the features in accordance with embodiments of the disclosure. The summary is not intended to limit the scope of any embodiments described herein.

BRIEF DESCRIPTION OF DRAWINGS

In order to more clearly illustrate the technical solutions in the embodiments of the present disclosure, drawings needed to be used in the description of the embodiments are briefly described below. Apparently, the drawings below are just some embodiments of the present disclosure, and other drawings can also be obtained by those skilled in the art based on these drawings without paying any creative effort.

FIG. 1 illustrates a method flowchart of an image processing method provided by an embodiment of the present disclosure.

FIG. 2 illustrates a method flowchart of an image processing method provided by another embodiment of the present disclosure.

DETAILED DESCRIPTION OF EMBODIMENTS

Figure 3:
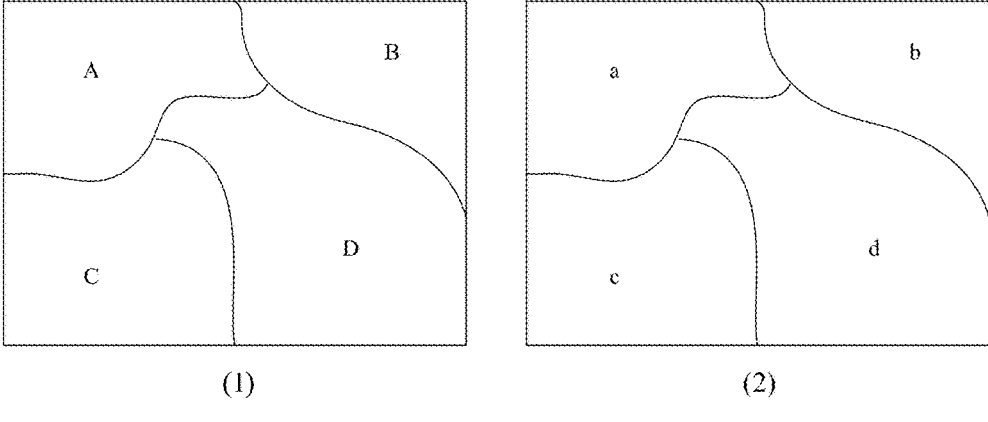
FIG. 3 illustrates an example diagram of determining to-be-fused images as provided by an embodiment of the present disclosure.

The technical solutions in the embodiments of the present disclosure will be described clearly and comprehensively, in conjunction with the drawings in the embodiments of the present disclosure. It is clear that the described embodiments are only a part, but not all, of embodiments of the present disclosure. Based on the embodiments in the present disclosure, all other embodiments, obtained by those skilled in the art without creative labor, fall within the scope of protection of the present disclosure.

In recent years, with the continuous development of smart terminal technology, the technology of photographing images through smart terminals has become better and better. For example, for a high dynamic range scene, a high-quality image may be obtained by performing multiple exposures for the same scene, and then synthesizing multiple images, formed at different exposure parameters, into one image.

Embodiments of the present disclosure will be described in detail below, in conjunction with the drawings.

Referring to FIG. 1, an embodiment of the present disclosure provides an image processing method applicable to an electronic device. The electronic device includes an image sensor, a Pre-ISP (Pre-Image Signal Processor), an image signal processor, and a control module. The Pre-ISP includes a gain module, a denoising module, and a fusion module. The method includes operations as follows.

At block S110, the image sensor acquires an original image.

It is notable that the electronic device in the embodiment may include an image sensor (sensor) supporting an HDR function. In this case, the original image is an image captured by the electronic device when the HDR function is off.

Alternatively, the electronic device may also include an image sensor not supporting the HDR function. In this case, the original image is an image captured by the electronic device. The original image may be an image captured by the image sensor of the electronic device, or an image transmitted through other devices, or an image downloaded from a cloud server through the network. In the disclosure, the source of the original image is not limited.

In an implementation, the original image is an image of single frame.

At block S120, the Pre-ISP applies a gain to the original image, to obtain a first image.

In this embodiment, before inputting the original image into the image signal processor for image processing, the brightness of the original image may be increased to improve the overall brightness-and-darkness of the original image. Specifically, the gain module in the Pre-ISP applies a gain to the original image to obtain the first image, and at that time, the brightness of the first image is greater than the brightness of the original image.

In an implementation, the gain module may determine a brightness parameter of the original image, and apply, based on the brightness parameter, a gain to the original image to obtain the first image. Among them, the brightness parameter may include an automatic exposure parameter of the original image. For different brightness parameters of the original image, the corresponding gains applied to the original image may vary in terms of magnitude.

For example, in one implementation, one frame of the original image may include a plurality of brightness parameters, and the plurality of brightness parameters may form a brightness value interval (that is, a color gradation index interval). The broader the brightness value interval, the smaller the magnitude of the gain applied to the original image; and the narrower the brightness value interval, the larger the magnitude of the gain applied to the original image.

In another implementation, the magnitude of the gain for the original image may also be determined according to the value of the brightness parameter. Specifically, the smaller the value of the brightness parameter, the larger the magnitude of the gain applied to the original image, that is, the greater the degree at which the brightness of the original image is increased; and the larger the value of the brightness parameter, the smaller the magnitude of the gain applied to the original image, that is, the less the degree at which the brightness of the original image is increased.

Alternatively, the magnitude of the gain applied to the original image may be a default value, or an adjustment value adaptive to the value of the brightness parameter, where the larger the value of the brightness parameter, the smaller the corresponding adjustment value; and the smaller the value of the brightness parameter, the larger the corresponding adjustment value. For example, in an implementation, for a first frame of the original image, a gain of a default value may be applied thereto, and in this way, for other frames subsequent to the first frame, the gain may be applied at the adjustment value which is adaptive to the value of the brightness parameter. In another implementation, for all single frames of the original image, the gain may be applied according to the adjustment value which is adaptive to the value of the brightness parameter. It is notable that the application of the gain in the embodiments is an operation in the Pre-Image signal processor, which is not the same operation as the application of a gain inside the image sensor.

In the embodiment, the control module of the electronic device may calculate contrast of the original image based on the brightness parameter(s), and then determine, based on the contrast, the magnitude of the gain for the original image.

It can be understood that, for a high-definition image, the brightness of the various colors of the image is relatively uniform, that is, the contrast of the image is apparent, otherwise the image may be caused to be whitened or blackened which affecting the clarity of the image. Thus, in order to better increase the brightness of the original image during the application of the gain, the contrast of the original image may be calculated based on the obtained brightness parameter(s), for example, the contrast of the original image may be calculated based on a plurality of automatic exposure parameters included in the original image.

Alternatively, the greater the contrast, the more likely that some parts of the image are too bright or too dark. Thus, to alleviate such phenomenon, in the embodiment, the greater the contrast, the larger the magnitude of the corresponding gain applied to the original image, so that the brightness distribution of the first image obtained after the application of the gain gets more uniform. If the contrast is small, the magnitude of the gain applied to the original image may be controlled to be reduced (that is, it is reduced relative to the magnitude of the gain that is correspondingly applied to the original image when the contrast is large, and the specific reducing amount may be set according to the actual demand), so that the brightness of the first image, obtained after the application of the gain, is increased relative to the brightness of the original image, thus improving the dynamic range of the image; furthermore, it can avoid a problem of whitening or blackening of the image that would be caused by imbalance of the contrast occurring when the brightness is increased excessively.

In some other embodiments, the original brightness of the original image may be maintained if the contrast is small. That is, in this way, the magnitude of the gain for the original image may be zero, that is to say, the brightness of the first image may be equal to the brightness of the original image.

At block S130, the first image is denoised to obtain a second image.

The increase of the brightness of the original image, which is achieved by increasing the gain, may cause the noise of the image to become increased. To alleviate this problem, the first image obtained after the application of the gain may be denoised by the denoising module in the Pre-ISP, to obtain the second image. Specifically, the first image may be denoised by the denoising module, based on the brightness parameter(s), to obtain the second image. The noise of the second image is less than the noise of the first image.

In the embodiment, the denoising module may determine a degree of denoising the first image, based on the magnitude of the gain applied by the gain module to the original image. The larger the magnitude of the gain applied to the original image, the greater the degree of the corresponding denoising. Specifically, the larger the magnitude of the gain applied to the original image, the greater the brightness of the obtained first image, and the greater the noise of the first image; in this case, the first image may be denoised at a relatively high degree of denoising, to make the noise of the second image effectively suppressed. The smaller the magnitude of the gain, the less the brightness of the obtained first image, and the smaller the noise of the first image; in this case, the first image may be denoised at a relatively low degree of denoising, to obtain a better image clarity, improving the quality of the second image.

At block S140, the original image is fused with the second image, to obtain a fused image.

In the embodiment, the original image may be fused with the second image through the fusion module in the Pre-ISP, to obtain the fused image with increased brightness and weakened noise.

Optionally, the first image in the embodiment may include one frame or multiple frames (the specific number of the frames is not limited), and accordingly, the second image may also include one frame or multiple frames. In this case, the fusion module may fuse the second image of one frame with the original image to obtain the fused image, or may fuse the second image of multiple frames with the original image to obtain the fused image.

For example, in a specific application scenario, the original image output from the image sensor of the electronic device may be input to the Pre-ISP; after the gain module in the Pre-ISP applies a gain to the original image, one frame or two frames may be obtained; and the denoising module in the Pre-ISP may denoise the one frame or two frames. Then, the original image is fused with an image that is obtained after denoising the one frame, to obtain the fused image (which fused image in this way includes a total of two frames); alternatively, the original image is fused with an image that is obtained after denoising the two frames, to obtain the fused image (which fused image in this way includes a total of 3 frames image).

In the image processing method provided by the present disclosure, the image sensor acquires the original image; and the Pre-ISP applies a gain to the original image to obtain the first image, denoises the first image to obtain the second image, and fuses the original image with the second image to obtain the fused image. Different from the fused image which is obtained by a time-domain multi-frame technique and which has the problem of ghosting caused by the exposure time interval, this method obtains the fused image by directly fusing the original image with an image that is obtained after the original image is applied with a gain and denoised, this does not need multiple exposures to obtain the fused image, thereby avoiding the problem of ghosting in image caused by the multiple exposures. Moreover, by fusing the original image with the second image that is obtained after the original image is applied with a gain and denoised, the resulting fused image has a high dynamic range, which in turn renders the fused image to be an HDR image. In this way, it enables the electronic device to obtain an HDR image without using the HDR technique, reduces the dependence of the electronic device on image sensors supporting an HDR function, and reduces the image processing cost in the process of improving the image quality.

Referring to FIG. 2, another embodiment of the present disclosure provides an image processing method applicable to an electronic device. The electronic device includes an image sensor and a Pre-ISP. The Pre-ISP includes a gain module, a denoising module, and a fusion module. The method includes operations as follows.

At block S210, the image sensor acquires an original image.

In the embodiment, if it is detected that the electronic device does not support a high dynamic range function, the image acquired by the image sensor may be used as the original image.

At block S220, the Pre-ISP applies a gain to the original image, to obtain a first image.

At block S230, the denoising module denoises the first image, to obtain a second image.

At block S240, the fusion module determines, based on a brightness value of the second image and a brightness threshold, at least one to-be-fused image.

Optionally, when the second image is fused with the original image, since each of the second image and the original image includes multiple image regions with different brightness, and the overall brightness of the second image is higher than the overall brightness of the original image, in order to ensure the overall brightness-and-darkness of the fused image, the fusion module may determine at least one to-be-fused image, based on the brightness value of the second image and the brightness threshold. Among others, one to-be-fused image may be understood as an image corresponding to a part of the second image or corresponding to a part of the original image, and the to-be-fused image may come from the second image, or from the original image, or from the second image and the original image. It is worth noting that, the size of the second image is the same as the size of the original image. In the embodiment, the specific value of the brightness threshold may be set according to actual demand.

In an implementation, a part of the original image, which corresponds to a region of the second image where the brightness value is greater than a first brightness threshold, is determined as a first to-be-fused image; and a part of the second image, which corresponds to a region of the second image where the brightness value is less than a second brightness threshold, is determined as a second to-be-fused image, where the first brightness threshold is larger than the second brightness threshold. In addition, a part of the original image corresponding to a region of the second image where the brightness value is between the second brightness threshold and the first brightness threshold, and a part of the second image corresponding to the region of the second image where the brightness value is between the second brightness threshold and the first brightness threshold, are determined as a third to-be-fused image.

In the case where the brightness value of the second image is between the second brightness threshold and the first brightness threshold, a weight parameter is determined for the part of the original image corresponding to the region of the second image where the brightness value is between the second brightness threshold and the first brightness threshold, and a weight parameter is determined for the part of the second image corresponding to the region of the second image where the brightness value is between the second brightness threshold and the first brightness threshold. The closer the brightness value of the region is to the first brightness threshold, the larger the weight parameter for the original image may be, so as to avoid a phenomenon that whitening of the region is caused due to excessive brightness of the region after the image fusion. The closer the brightness value of the region is to the second brightness threshold, the larger the weight parameter for the second image may be, so as to expand the brightness range of the fused image and enhance the contrast of the image. In this way, the part of the original image and the part of the second image may be combined according to their respective weight parameters, to obtain an image as the third to-be-fused image.

For example, in a specific application scenario, the brightness threshold may be set as the first brightness threshold and the second brightness threshold. The first brightness threshold may be a bright threshold in the color gradation index, and the second brightness threshold may be a dark threshold in the color gradation index, and the value of the bright threshold is larger than the value of the dark threshold. Optionally, for a region of the second image where the brightness value is greater than the bright threshold, during the fusing processing, a part of the original image corresponding to the region is selected as the to-be-fused image, so as to avoid the phenomenon that whitening of the region is caused due to excessive brightness of the region after the image fusion. For a region of the second image where the brightness value is less than the dark threshold, during the fusing processing, a part of the second image corresponding to the region is selected as the to-be-fused image, so as to expand the brightness range of the fused image and enhance the contrast of the image. For a region of the second image where the brightness value is greater than the dark threshold and less than the bright threshold, during the fusing processing, corresponding weights may be respectively assigned to a part of the second image corresponding to the region and a part of the original image corresponding to the region, where the weights may be understood as a ratio for selecting the original image and the second image; and then, the part of the second image and the part of the original image, each of which corresponding to the region, are selected based on the weights, to serve as the to-be-fused image. Then, the to-be-fused images obtained in the above three cases are stitched together to obtain a target image.

Optionally, in the case where the brightness value of the second image is larger than the dark threshold and less than the bright threshold, in assigning the corresponding weights to the second image and the original image, the closer the brightness value of the region is to the bright threshold, the larger the weight for the original image and the less the weight for the second image; and the closer the brightness value of the region is to the dark threshold, the less the weight for the original image and the larger the weight for the second image. By targetedly selecting images of to-be-fused regions, the contrast of the fused image can be improved, which in turn improves the clarity and quality of the image.

The above application scenario is detailed below by taking FIG. 3 as an example. It is assumed that FIG. 3(1) illustrates the original image and FIG. 3(2) illustrates the second image, and the original image includes the same number of image regions as the second image, that is, as shown in FIG. 3, the original image includes an image region A, an image region B, an image region C, and an image region D, and the second image includes an image region a, an image region b, an image region c, and an image region d. The image brightness of different image regions of the same image may be different, the image brightness of a same image region of different images may be different, and the image brightness of different image regions of different images may be different.

In this way, if the brightness value of the image region b of the second image is larger than the bright threshold, then an image in the image region B of the original image may be determined as the first to-be-fused image, so as to avoid overexposure of the fused image that is caused due to excessive brightness when an image in the image region b is selected for fusion. It is notable that, the position of the image region b in the second image corresponds to the position of the image region B in the original image (which may be understood as being located at the same position). If the brightness value of the image region c of the second image is less than the dark threshold, an image in the image region C of the original image may be determined as the second to-be-fused image, so that the brightness difference of the image is apparent at the time of image fusion, and thus the overall brightness-and-darkness of the fused image is ensured. If the brightness values of the image region a and the image region d of the second image are between the dark threshold and bright threshold, weights may be determined respectively for the image region A and the image region D of the original image, and weights may also be determined for the image region a and the image region d of the second image; and then, the third to-be-fused image is determined based on the respective weights of the image region A, the image region D, the image region a and the image region d.

For example, taking the image region A and the image region a as an example, if the brightness value of the image region A is close to the bright threshold, it may be determined that the weight of the image region A is 70% for fusion, and the weight of the image region a is 30%. Then, in the fusion, 70% of the image in the image region A is selected to be fused with 30% of the image in the image region a. And if the brightness value of the image region A is close to the dark threshold, it may be determined that the weight of the image region A is 15% for fusion, and the weight of image region a is 85%. Then, in the fusion, 15% of the image in the image region A is selected to be fused with 85% of the image in the image region a.

At block S250, the at least one to-be-fused image is stitched, to obtain the fused image.

Optionally, if the to-be-fused images include the first to-be-fused image, the second to-be-fused image, and the third to-be-fused image as described above, the first to-be-fused image, the second to-be-fused image, and the third to-be-fused image may be stitched together, to obtain the fused image.

Figure 4:
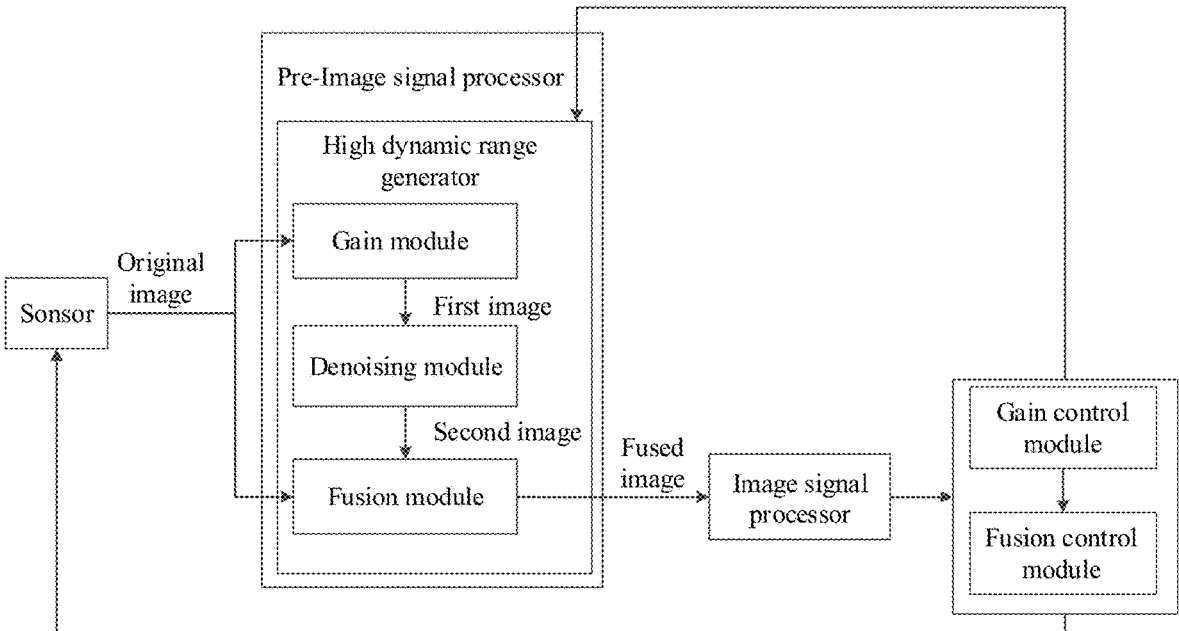
FIG. 4 illustrates a schematic diagram of an image processing procedure provided by an embodiment of the present disclosure.

The following is an exemplary illustration of this embodiment, by taking FIG. 4 as an example.

Taking a case where the original image is captured by the electronic device itself as an example, the electronic device may acquire the original image output from a camera sensor, and then input the original image into a high dynamic range generator of the Pre-Image signal processor. The gain module in the high dynamic range generator first applies a gain to the original image, to obtain the first image. Then, the first image is input to the denoising module, and the denoising module denoises the first image, to obtain the second image. Then, the second image is input to the fusion module, and the fusion module makes the original image fused with the second image, to obtain the fused image. Then, the fused image is input to the image signal processor. Optionally, an image output from the image signal processor may pass through a gain control module and a fusion control module, so that a processing procedure in the high dynamic range generator or a parameter involved in the processing procedure is adjusted, based on the brightness parameter(s) and the noise parameter(s) of the image. The gain control module is configured to determine the contrast of the original image, and control the gain module to determine, based on the contrast, the magnitude of the gain for the original image. The gain control module is also configured to control the denoising module to determine, based on the magnitude of the gain, the degree of denoising the first image. The larger the magnitude of the gain, the greater the corresponding degree of denoising. The fusion control module is configured to control the fusion module to adjust, based on the brightness value of the second image and the brightness threshold, the to-be-fused image(s), that is, to control the selection of the to-be-fused image(s) for fusion. The gain control module and the fusion control module may also return the relevant parameter(s) to the sensor. By adding the Pre-Image signal processor to the original image processing framework, and adding the high dynamic range generator to the Pre-Image signal processor, it is enabled to output an image with greater brightness. In addition, by fusing the frame(s) of the original image with the frame(s) of the newly generated image, the image input to the image signal processor is enabled to have a high dynamic range.

In the image processing method provided by the present disclosure, based on the comparison result of the brightness value of the second image and the brightness threshold, the to-be-fused image(s) are selected targetedly, it can improve the contrast of the fused image, which in turn improves the clarity and the quality of the image. Different from the fused image which is obtained by a time-domain multi-frame technique and which has the problem of ghosting caused by the exposure time interval, in this disclosure, the fused image is obtained by directly fusing the original image with an image that is obtained after the original image is applied with a gain and denoised, this does not need multiple exposures to obtain the fused image, thereby avoiding the problem of ghosting in image caused by the multiple exposures.

Figure 5:
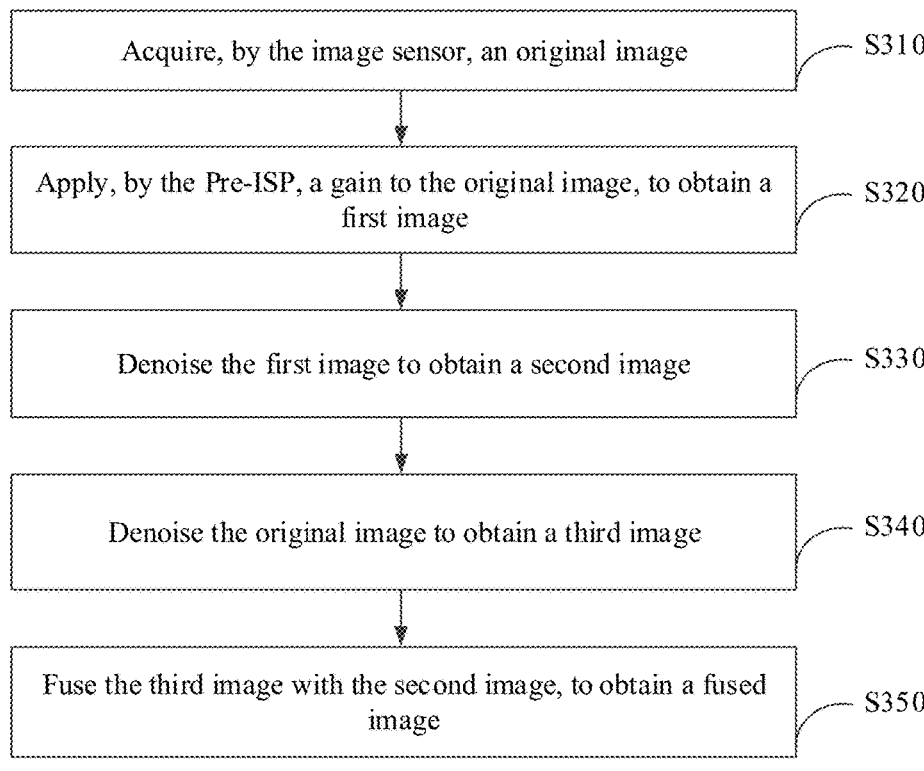
FIG. 5 illustrates a method flowchart of an image processing method provided by another embodiment of the present disclosure.

Referring to FIG. 5, another embodiment of the present disclosure provides an image processing method applicable to an electronic device. The electronic device includes an image sensor and a Pre-ISP, where the Pre-ISP includes a gain module, a denoising module, and a fusion module. The method includes operations as follows.

At block S310, the image sensor acquires an original image.

At block S320, the Pre-ISP applies a gain to the original image, to obtain a first image.

At block S330, the first image is denoised, to obtain a second image.

A denoising parameter corresponding to the gain parameter is acquired, and the first image is denoised based on the denoising parameter, to obtain the second image.

Optionally, for the noise generated through the application of a gain to the original image, machine learning may also be incorporated. Specifically, by inputting images obtained after being processed with different gains (e.g., images with a high noise and images with a low noise) into a convolutional neural network, and training the convolutional neural network, so that the trained convolutional neural network can have a function of processing a noisy image into a low-noise image. In this approach, noise characteristics of the images, obtained after being processed with different gains, may be acquired, where such noise characteristics are output by the convolutional neural network; and a relationship between the magnitudes of the gains and the noise characteristics may be obtained. Then, the trained convolutional neural network may be used to denoise the first image, which can reduce the loss of image quality that is caused due to the application of the gain.

Optionally, in addition to denoising the first image based on the denoising parameter, multiple (e.g., two or three) denoising algorithms may be used to denoise the first image sequentially, so that the second image obtained after the denoising can be close to the image itself, and thus the target image obtained after fusion can be close to the HDR image obtained through the original image processing using the multi-frame image, where the types of specific algorithms may not be limited.

At block S340, the Pre-ISP denoises the original image, to obtain a third image.

Figure 6:
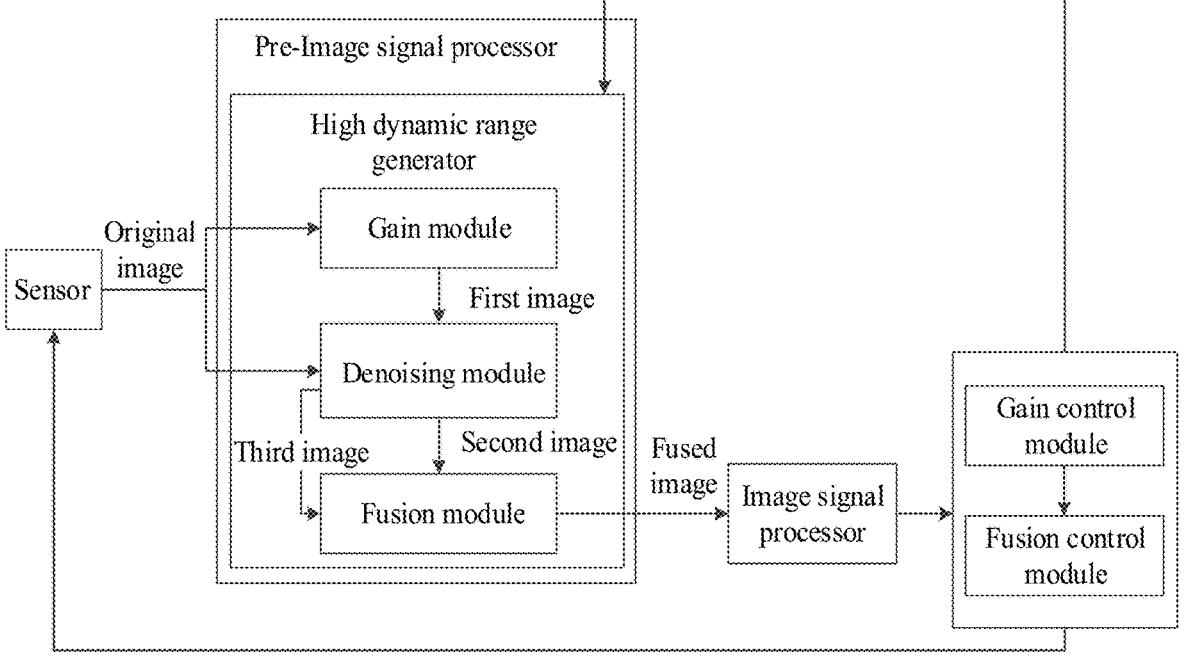
FIG. 6 illustrates a schematic diagram of another image processing procedure provided by an embodiment of the present disclosure.

In this embodiment, before fusing the second image with the original image, in order to further optimize the quality of the fused image, the denoising module of the Pre-ISP may denoise the original image separately, to obtain a third image with better clarity (as shown in FIG. 6, the original image is denoised, and then the denoised image is fused with the second image; for the description of the other contents of FIG. 6, reference may be made to the description of FIG. 4, which will not be repeated here). For the principle of the denoising and the implementation process thereof, reference may be made to the previous description, which will not be repeated here.

Optionally, when denoising the original image separately, the degree of denoising may refer to the degree of denoising applied to the first image described above. In some embodiments, the degree of denoising applied to the original image separately may be equal to the degree of denoising applied to the first image, in order to better improve the clarity of the fused image. It is understood that, in some other embodiments, the noise of the original image may not be as great as the noise of the first image obtained after the application of the gain, and thus the degree of denoising the original image separately may also be less than the degree of denoising the first image, so as to save processing energy.

Optionally, the times of denoising the original image separately may not be limited. For example, if the original image has severe ghosting, denoising may be separately performed on the original image two or more times.

At block S350, the third image is fused with the second image, to obtain the fused image.

As an implementation, the fusion module in the Pre-ISP make the second image fused with the third image obtained after the separate denoising, which enables the resulting fused image to have increased clarity and brightness, effectively improving the image quality.

It is notable that, in the embodiment, at the time of fusing the second image with the third image, in an implementation, at least one to-be-fused image may be determined, based on the brightness value of the second image and a brightness threshold; and then, the at least one to-be-fused image may be stitched, to obtain the fused image. The determining, based on the brightness value of the second image and the brightness threshold, at least one to-be-fused image may include: determining, as a first to-be-fused image, a part of the third image corresponding to a region of the second image where the brightness value is larger than a first brightness threshold; determining, as a second to-be-fused image, a part of the second image corresponding to a region of the second image where the brightness value is less than a second brightness threshold, where the first brightness threshold is greater than the second brightness threshold; and determining, as a third to-be-fused image, a part of the third image and a part of the second image each corresponding to a region of the second image where the brightness value is between the first brightness threshold and the second brightness threshold. In another embodiment, at least one to-be-fused image may also be determined, based on the brightness value of the third image and specified brightness threshold(s); and then, the at least one to-be-fused image is stitched to obtain the fused image. For the specific process of determining the to-be-fused image(s) and the determining logic, reference may be made to the corresponding description in the preceding embodiments.

In the image processing method provided by this embodiment, the original image is separately denoised to obtain the third image, and then the third image is fused with the second image, which enables the resulting fused image to have a higher clarity and better image quality. Different from the fused image which is obtained by a time-domain multi-frame technique and which has the problem of ghosting caused by the exposure time interval, in this disclosure, the fused image is obtained by directly fusing the original image with an image that is obtained after the original image is applied with a gain and denoised, this does not need multiple exposures to obtain the fused image, thereby avoiding the problem of ghosting in image caused by the multiple exposures.

Figure 7:
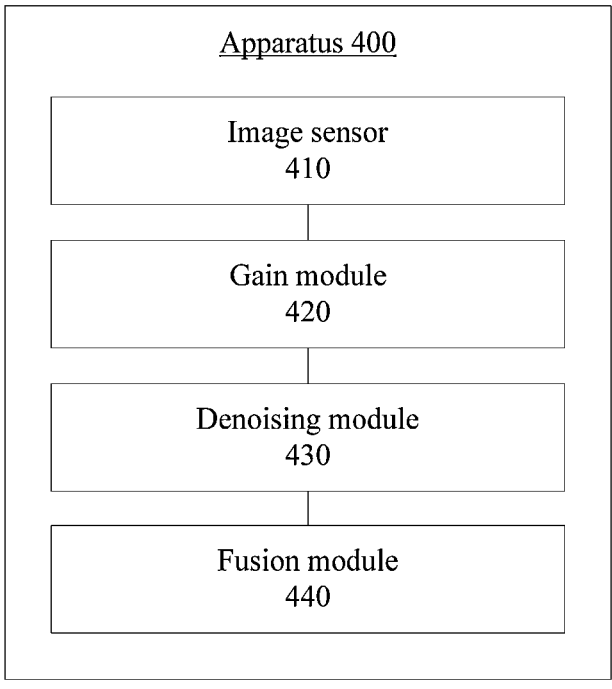
FIG. 7 illustrates a structural block diagram of an image processing apparatus provided by an embodiment of the present disclosure.

Referring to FIG. 7, the embodiments of the present disclosure provides an image processing apparatus 400, implemented in an electronic device. The apparatus 400 includes:

an image sensor 410, configured to acquire an original image.

The image sensor 410 in the embodiment may be a ccd (Charge Coupled Device) sensor, or a cmos (Complementary Metal-Oxide-Semiconductor) sensor. The specific type of sensor may not be limited herein.

Optionally, the image sensor 410 may be configured to use an image obtained by the image sensor as the original image, when it is detected that the electronic device does not support a high dynamic range function.

The apparatus 400 further includes a gain module 420 configured to apply a gain to the original image, to obtain a first image.

The gain module 420 includes: a brightness parameter acquiring unit, configured to determine a brightness parameter of the original image; and a gain applying unit, configured to apply, based on the brightness parameter, the gain to the original image, to obtain the first image.

As an implementation, the gain module 420 may be configured to determine the brightness parameter of the original image, and apply, based on the brightness parameter, a gain to the original image, to obtain the first image.

The apparatus 400 further includes a denoising module 430, configured to denoise the first image to obtain a second image.

The denoising module 430 may be configured to denoise, based on the brightness parameter, the first image to obtain the second image.

The apparatus 400 further includes a fusion module 440, configured to fuse the original image with the second image, to obtain a fused image.

The fusion module 440 is configured to: determine at least one to-be-fused image, based on the brightness value of the second image and a brightness threshold; and stitch the at least one to-be-fused image, to obtain a fused image. The determining the at least one to-be-fused image based on the brightness value of the second image and the brightness threshold may include: by the fusion module, determining, as a first to-be-fused image, a part of the original image corresponding to a region of the second image where the brightness value is greater than the first brightness threshold; determining, as a second to-be-fused image, a part of the second image corresponding to a region of the second image where the brightness value is less than the second brightness threshold, the first brightness threshold is greater than the second brightness threshold; and determining, as a third to-be-fused image, a part of the original image and a part of the second image each corresponding to a region of the second image where the brightness value is between the first brightness threshold and the second brightness threshold. The determining, as a third to-be-fused image, a part of the original image and a part of the second image each corresponding to a region of the second image where the brightness value is between the first brightness threshold and the second brightness threshold, includes: determining a weight parameter for a part of the original image corresponding to the region of the second image where the brightness value is between the second brightness threshold and the first brightness threshold, and determining a weight parameter for a part of the second image corresponding to the region of the second image where the brightness value is between the second brightness threshold and the first brightness threshold, where the closer the brightness value of the region is to the first brightness threshold, the larger the weight parameter for the part of the original image, and the closer the brightness value of the region is to the second brightness threshold, the larger the weight parameter for the part of the second image; and combining the part of the original image and the part of the second image, based on their corresponding weight parameters, to obtain an image as the third to-be-fused image.

Optionally, the apparatus 400 may further include a second denoising module configured to, before the original image is fused with the second image to obtain the fused image, denoise the original image through the Pre-ISP to obtain a third image. In this way, the fusion module 440 may be configured to fuse the second image with the third image, to obtain the fused image.

Figure 8:
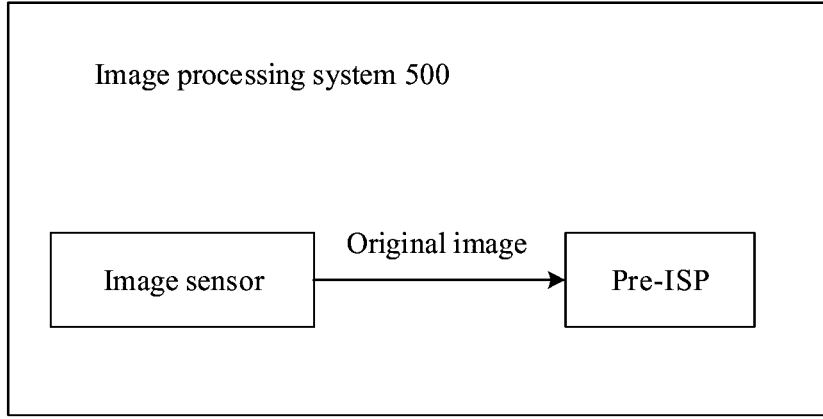
FIG. 8 illustrates a schematic architecture diagram of an image processing system provided by an embodiment of the present disclosure.

Referring to FIG. 8, the embodiments of the present disclosure provide an image processing system 500. The system 500 includes:

an image sensor, configured to acquire an original image; and a Pre-ISP, configured to apply a gain the original image to obtain a first image, denoise the first image to obtain a second image, and fuse the original image with the second image to obtain a fused image.

Figure 9:
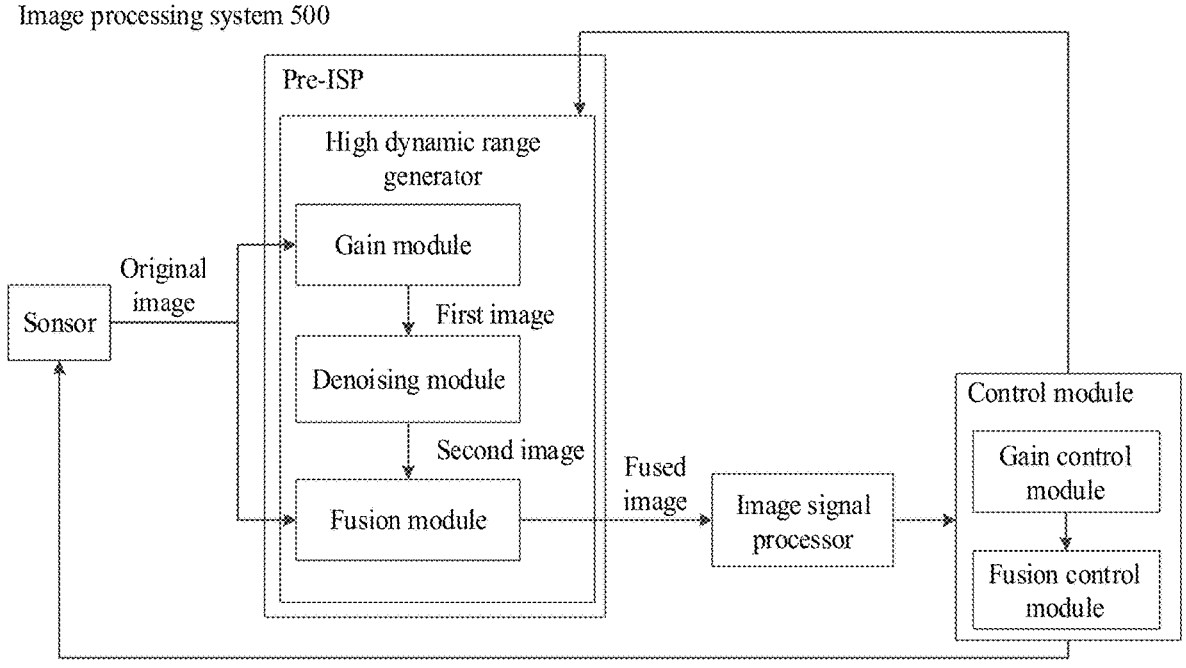
FIG. 9 illustrates a schematic architecture diagram of another image processing system provided by an embodiment of the present disclosure.

In the embodiment, as shown in FIG. 9, the Pre-ISP includes a gain module, a denoising module, and a fusion module. The system further includes: an image signal processor and a control module. The image signal processor configured to receive the fused image output from the Pre-ISP and process the fused image. The control module includes a gain control module and a fusion control module. The gain control module is configured to: determine the contrast of the original image; control the gain module to determine, based on the contrast, the magnitude of the gain for the original image; and control the denoising module to determine, based on the magnitude of the gain, the degree of denoising the first image, where the larger the magnitude of the gain, the greater the degree of denoising. The fusion control module is configured to control the fusion module to adjust the to-be-fused image(s), based on the brightness value of the second image and a brightness threshold. Specifically, the to-be-fused image region(s) and the weights of the to-be-fused image region(s) as described in the preceding embodiments may be adjusted, for which reference may be made to the relevant description in the preceding embodiments, which will not be repeated herein.

It can be clearly understood by those skilled in the art that, for the convenience and brevity of the description, as for the specific working process of the apparatus and modules described above, reference may be made to the corresponding process in the aforementioned method embodiment, which will not be repeated here.

In several embodiments provided of the present disclosure, the coupling or direct coupling or communication connections between the modules as shown or discussed may be indirect coupling or communication connections between devices or modules through interfaces, and which may be electrical, mechanical or in other forms.

Alternatively, the various functional modules in the embodiments of the present disclosure may be integrated into a single processing module, or each module may be physically present alone, or two or more modules may be integrated in a single module. The above integrated modules may be implemented either in the form of hardware or in the form of software functional modules.

Figure 10:
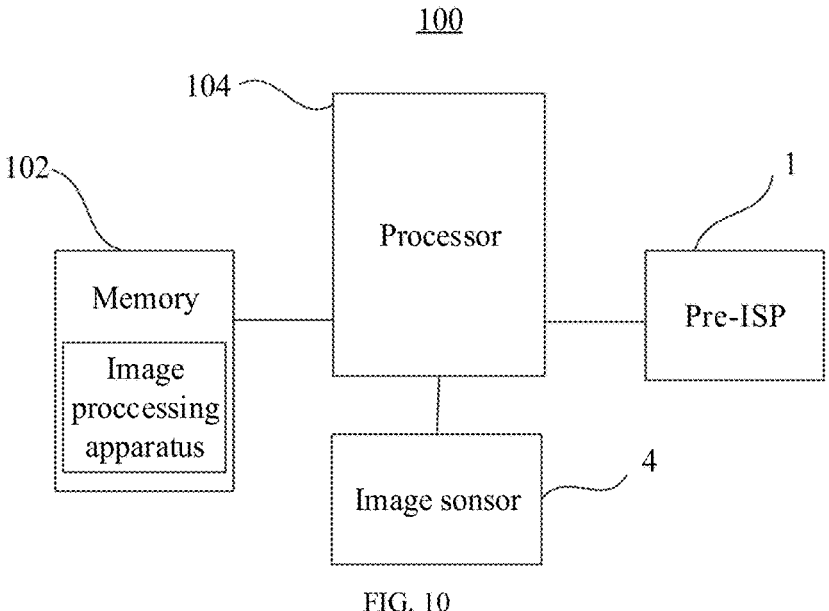
FIG. 10 illustrates a structural block diagram of an electronic device of the present disclosure which is adapted to implement an image processing method according to the embodiments of the present disclosure.

Referring to FIG. 10, based on the image processing method and apparatus described above, the embodiments of the present disclosure also provide an electronic device 100 that can implement the aforementioned image processing method. The electronic device 100 includes an image sensor 4, a Pre-ISP 1, a memory 102, and one or more (only one is shown in the figure) processors 104 coupled to each other. The memory 102 and the processor(s) 104 are connected to each other through a communication line. The memory 102 stores a program capable of executing the contents of the preceding embodiments, and the processor 104 may execute the program stored in the memory 102.

The processor 104 may include one or more processing cores. The processor 104 uses various interfaces and lines to connect various parts within the entire electronic device 100, and implements various functions of the electronic device 100 and processes data by running or executing instructions, programs, code sets or instruction sets, and calling data stored in memory 102. Optionally, the processor 104 may be implemented in at least one hardware form of Digital Signal Processing (DSP), Field-Programmable Gate Array (FPGA) or Programmable Logic Array (PLA). The processor 104 may integrate one or a combination of Central Processing Unit (CPU), Graphics Processing Unit (GPU), and modem. The CPU mainly handles the operating system, user interface and applications, etc. The GPU is responsible for rendering and drawing the display contents. The modem is used to handle wireless communication. It can be understood that the above modem may also be implemented through a separate communication chip, without being integrated into the processor 104.

The memory 102 may include Random Access Memory (RAM) or Read-Only Memory (RAM). The memory 102 may be configured to store instructions, programs, codes, code sets, or instruction sets. For example, the memory 102 may have codes stored therein for implementing the image processing apparatus 400. The memory 102 may include a program storing region and a data storing region. The program storing region may store instructions for implementing an operating system, instructions for implementing at least one function (e.g., a touch function, a sound playback function, and an image playback function), instructions for implementing the preceding embodiments, etc. The data storing region may also store data created by the electronic device 100 during use (e.g., phone book, audio/video data, and chat log data), etc.

The image sensor 4 is configured to acquire an original image. The Pre-ISP 1 is configured to: apply a gain the original image to obtain a first image; denoise the first image to obtain a second image; and fuse the original image with the second image, to obtain a fused image.

Figure 11:
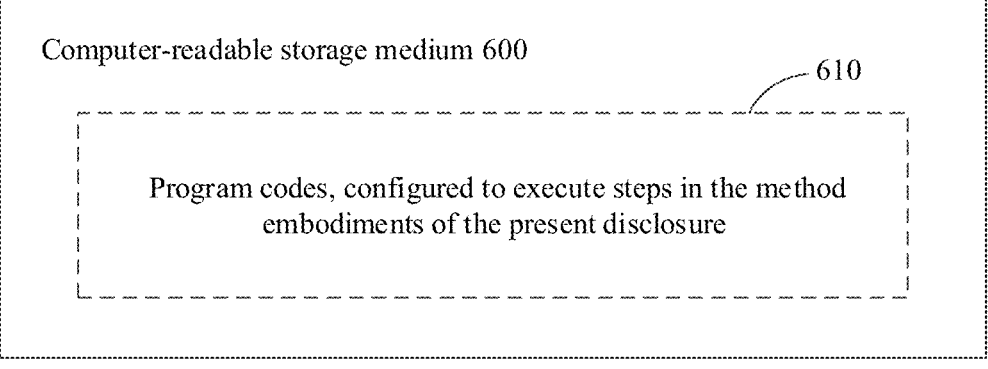
FIG. 11 illustrates a storage unit provided by an embodiment of the present disclosure, which is adapted to save or carry program codes for implementing an image processing method according to the embodiments of the present disclosure.

Referring to FIG. 11, it illustrates a block diagram of a structure of a computer-readable storage medium provided by an embodiment of the present disclosure. The computer-readable storage medium 600 has program codes stored therein. The program codes are capable of being invoked by a processor to implement the method described in the method embodiments described above.

The computer-readable storage medium 600 may be an electronic memory such as a flash memory, an EEPROM (Electrically Erasable Programmable Read-Only Memory), an EPROM, a hard disk, or a ROM. Optionally, the computer-readable storage medium 600 includes a non-transitory computer-readable storage medium. The computer-readable storage medium 600 has a storage space for program codes 610 that implement any of the method blocks of the method described above. The program codes may be read from or written into one or more computer program products. The program codes 610 may, for example, be compressed in an appropriate form.

In summary, in the image processing method, apparatus, and system, the electronic device, and the storage medium provided by the present disclosure, an image sensor acquires an original image. A Pre-ISP applies a gain to the original image to obtain a first image, denoises the first image to obtain a second image, and fuses the original image with the second image, to obtain a fused image. Different from the fused image which is obtained by a time-domain multi-frame technique and which has the problem of ghosting caused by the exposure time interval, this method obtains the fused image by directly fusing the original image with an image that is obtained after the original image is applied with a gain and denoised, this does not need multiple exposures to obtain the fused image, thereby avoiding the problem of ghosting in image caused by the multiple exposures.

Finally, it is notable that the above embodiments are only used to illustrate the technical solutions of the present disclosure, and not to limit them. Despite the present disclosure has been described in detail with reference to the preceding embodiments, it is understandable by those skilled in the art that, it is still possible to modify the technical solutions described in the preceding embodiments, or to replace some of the technical features with equivalent ones; and such modifications or replacements do not make the essence of the corresponding technical solutions depart from the spirit and scope of the technical solutions of the various embodiments of the present disclosure.

What is claimed is:

1. An image processing method, for an electronic device, the electronic device comprising an image sensor and a Pre-Image Signal Processor (Pre-ISP), and the method comprising:

acquiring, by the image sensor, an original image;

applying, by the Pre-ISP, a gain to the original image, to obtain a first image;

denoising, by the Pre-ISP, the first image to obtain a second image; and fusing, by the Pre-ISP, the original image with the second image, to obtain a fused image, comprising:

for a first region of the second image where a brightness value is greater than a first brightness threshold and a corresponding first region of the original image, determining only the corresponding first region of the original image as a first to-be-fused image;

for a second region of the second image where the brightness value is less than a second brightness threshold and a corresponding second region of the original image, determining only the second region of the second image as a second to-be-fused image, the first brightness threshold being greater than the second brightness threshold;

for a third region of the second image where the brightness value is between the second brightness threshold and the first brightness threshold and a corresponding third region of the original image, determining both the third region of the second image and the corresponding third region of the original image as a third to-be-fused image; and stitching the first to-be-fused image, the second to-be-fused image, and the third to-be-fused image, thereby obtaining the fused image.

2. The method of claim 1, wherein the Pre-ISP comprises a gain module, a denoising module and a fusion module; and wherein applying, by the Pre-ISP, the gain to the original image to obtain a first image, comprises:

applying, by the gain module, the gain to the original image, to obtain the first image;

wherein denoising, by the Pre-ISP, the first image to obtain the second image, comprises:

denoising, by the denoising module, the first image to obtain the second image; and wherein fusing, by the Pre-ISP, the original image and the second image to obtain the fused image, comprises:

fusing, by the fusion module, the original image with the second image, to obtain the fused image.

3. The method of claim 2, wherein applying, by the gain module, the gain to the original image to obtain the first image, comprises:

determining, by the gain module, a brightness parameter of the original image; and applying, by the gain module and based on the brightness parameter, the gain to the original image, to obtain the first image; and wherein denoising, by the denoising module, the first image to obtain the second image, comprises:

denoising, by the denoising module and based on the brightness parameter, the first image to obtain the second image.

4. The method of claim 3, wherein applying, based on brightness parameter, the gain to the original image to obtain the first image, comprises:

determining, based on a value of the brightness parameter, a magnitude of the gain for the original image, wherein the smaller the value of the brightness parameter, the larger the magnitude of the gain for the original image; and the larger the value of the brightness parameter, the smaller the magnitude of the gain for the original image.

5. The method of claim 4, wherein determining, based on the value of the brightness parameter, the magnitude of the gain for the original image, comprises:

calculating, based on the value of the brightness parameter, a contrast of the original image; and determining, based on the contrast of the original image, a magnitude of the gain for the original image, wherein the larger the contrast of the original image, the larger the magnitude of the gain for the original image, and the smaller the contrast of the original image, the smaller the magnitude of the gain for the original image.

6. The method of claim 3, wherein the original image has a plurality of brightness parameters, the plurality of brightness parameters defines a brightness value interval, the broader the brightness value interval, the smaller a magnitude of the gain applied to the original image; and the narrower the brightness value interval, the larger the magnitude of the gain applied to the original image.

7. The method of claim 2, wherein denoising, by the denoising module, the first image to obtain the second image, comprises:

denoising, by the denoising module, the first image based on a magnitude of the gain for the original image, to obtain the second image, wherein the larger the magnitude of the gain for the original image, the higher a degree of denoising the first image, and the smaller the magnitude of the gain for the original image, the lower the degree of denoising the first image.

8. The method of claim 1, wherein for the third region of the second image where the brightness value is between the second brightness threshold and the first brightness threshold and the corresponding third region of the original image, determining both the third region of the second image and the corresponding third region of the original image as the third to-be-fused image, comprises:

determining a weight parameter for the corresponding third region of the original image, and determining a weight parameter for the third region of the second image, wherein the closer the brightness value of the third region of the second image is to the first brightness threshold, the larger the weight parameter for the corresponding third region of the original image; the closer the brightness value of the third region of the second image is to the second brightness threshold, the larger the weight parameter for the third region of the second image; and combining the corresponding third region of the original image and the third region of the second image, based on corresponding weight parameters, to obtain an image as the third to-be-fused image.

9. The method of claim 1, wherein acquiring, by the image sensor, the original image comprises:

taking, as the original image, an image acquired by the image sensor, in response to detecting that the electronic device fails to support a high dynamic range function.

10. The method of claim 1, wherein a size of the second image is the same as a size of the original image.

11. An electronic device, comprising:

an image sensor, configured to acquire an original image, wherein the original image is acquired by the image sensor without using a high dynamic range function; and a Pre-Image Signal Processor (Pre-ISP), configured to apply a gain to the original image, to obtain a first image; denoise the first image to obtain a second image; denoise the original image to obtain a third image; and fuse the third image with the second image, to obtain a fused image;

wherein the Pre-ISP is specifically configured to:

for a first region of the second image where a brightness value is greater than a first brightness threshold and a corresponding first region of the third image, determine only the corresponding first region of the third image as a first to-be- fused image;

for a second region of the second image where the brightness value is less than a second brightness threshold and a corresponding second region of the third image, determine only the second region of the second image as a second to-be- fused image, the first brightness threshold being greater than the second brightness threshold;

for a third region of the second image where the brightness value is between the second brightness threshold and the first brightness threshold and a corresponding third region of the third image, determine both the third region of the second image and the corresponding third region of the third image as a third to-be-fused image; and stitch the first to-be-fused image, the second to-be-fused image, and the third to-be-fused image, thereby obtaining the fused image.

12. The electronic device of claim 11, wherein the Pre-ISP is configured to:

determine a brightness parameter of the original image;

apply, based on the brightness parameter, the gain to the original image, to obtain the first image; and denoise, based on the brightness parameter, the first image to obtain the second image.

13. The electronic device of claim 11, wherein the Pre-ISP is configured to:

determine a weight parameter for the corresponding third region of the third image, and determine a weight parameter for the third region of the second image, wherein the closer the brightness value of the third region of the second image is to the first brightness threshold, the larger the weight parameter for the corresponding third region of the third image; the closer the brightness value of the third region of the second image is to the second brightness threshold, the larger the weight parameter for the third region of the second image; and combine the corresponding third region of the third image and the third region of the second image, based on corresponding weight parameters, to obtain an image as the third to-be-fused image.

14. The electronic device of claim 11, wherein a degree of denoising applied to the original image is equal to or less than a degree of denoising applied to the first image.

15. A non-transitory computer-readable storage medium, having program codes stored therein, wherein the program codes, when being executed by a processor, cause an image processing method to be implemented, the method comprising:

acquiring an original image, wherein the original image is acquired without using a high dynamic range function;

applying a gain to the original image, to obtain a first image;

denoising the first image to obtain a second image; and fusing the original image with the second image, to obtain a fused image, comprising:

for a first region of the second image where a brightness value is greater than a first brightness threshold and a corresponding first region of the original image, determining only the corresponding first region of the original image as a first to-be-fused image;

for a second region of the second image where the brightness value is less than a second brightness threshold and a corresponding second region of the original image, determining only the second region of the second image as a second to-be-fused image, the first brightness threshold being greater than the second brightness threshold;

for a third region of the second image where the brightness value is between the second brightness threshold and the first brightness threshold and a corresponding third region of the original image, determining both the third region of the second image and the corresponding third region of the original image as a third to-be-fused image; and stitching the first to-be-fused image, the second to-be-fused image, and the third to-be-fused image, thereby obtaining the fused image.

16. The non-transitory computer-readable storage medium of claim 15, wherein for the third region of the second image where the brightness value is between the second brightness threshold and the first brightness threshold and the corresponding third region of the original image, determining both the third region of the second image and the corresponding third region of the original image as the third to-be-fused image, comprises:

determining a weight parameter for the corresponding third region of the original image, and determining a weight parameter for the third region of the second image, wherein the closer the brightness value of the third region of the second image is to the first brightness threshold, the larger the weight parameter for the corresponding third region of the original image; the closer the brightness value of the third region of the second image is to the second brightness threshold, the larger the weight parameter for the third region of the second image; and combining the corresponding third region of the original image and the third region of the second image, based on corresponding weight parameters, thereby obtaining the third to-be-fused image.

17. The non-transitory computer-readable storage medium of claim 15, wherein the applying a gain to the original image to obtain a first image, comprises:

calculating, based on a value of a brightness parameter of the original image, a contrast of the original image;

determining, based on the contrast of the original image, a magnitude of the gain for the original image; and applying the gain of the determined magnitude to the original image, to obtain the first image, wherein the larger the contrast of the original image, the larger the magnitude of the gain for the original image, and the smaller the contrast of the original image, the smaller the magnitude of the gain for the original image.

* * * * *